(12) United States Patent
Shimada et al.

(10) Patent No.: US 7,875,459 B2
(45) Date of Patent: Jan. 25, 2011

(54) METHOD AND APPARATUS FOR MANAGING DENITRATION CATALYST

(75) Inventors: Hiroshi Shimada, Hiroshima (JP); Yousuke Oka, Hiroshima (JP)

(73) Assignee: The Chugoku Electric Power Co., Inc., Hiroshima (JP)

( * ) Notice: Subject to any disclaimer, the term of this patent is extended or adjusted under 35 U.S.C. 154(b) by 1118 days.

(21) Appl. No.: 10/532,830

(22) PCT Filed: Oct. 30, 2003

(86) PCT No.: PCT/JP03/13952

§ 371 (c)(1),
(2), (4) Date: Apr. 26, 2005

(87) PCT Pub. No.: WO2004/043575

PCT Pub. Date: May 27, 2004

(65) Prior Publication Data

US 2006/0040397 A1     Feb. 23, 2006

(30) Foreign Application Priority Data

Nov. 1, 2002  (JP)  ............................. 2002-320390

(51) Int. Cl.
*G01N 31/10* (2006.01)
(52) U.S. Cl. .................. 436/73; 73/114.73; 60/276; 60/277
(58) Field of Classification Search .................. 422/98; 423/244.1; 436/37
See application file for complete search history.

(56) References Cited

U.S. PATENT DOCUMENTS

| 4,661,468 | A | * | 4/1987 | Lee et al. .................... 502/333 |
| 4,726,935 | A | * | 2/1988 | Inatsune et al. .............. 422/171 |
| 4,925,640 | A | * | 5/1990 | Morii et al. .............. 423/239.1 |
| 5,896,743 | A | * | 4/1999 | Griffin .......................... 60/274 |
| 6,199,372 | B1 | * | 3/2001 | Wakamoto .................... 60/274 |
| 6,258,981 | B1 | * | 7/2001 | Richardson et al. ......... 562/543 |
| 2003/0032188 | A1 | * | 2/2003 | Bailey et al. ................. 436/37 |
| 2006/0058176 | A1 | | 3/2006 | Shirakura |

FOREIGN PATENT DOCUMENTS

| EP | 0 262 558 A | 4/1988 |
| EP | 1 514 590 A | 3/2005 |
| JP | 61-227846 A | 10/1986 |
| JP | 64-080429 A | 3/1989 |

(Continued)

OTHER PUBLICATIONS

International Preliminary Examination Report, Sep. 29, 2004.

*Primary Examiner*—Yelena G Gakh
(74) *Attorney, Agent, or Firm*—Sughrue Mion, PLLC

(57) ABSTRACT

Data on a secular change of each denitration catalyst is managed based on data obtained by a periodic maintenance and a daily management. Management of a secular change and prediction on performance variations that occur until a next periodic check is performed. It is determined whether the denitration catalyst is deteriorated such that an exhaust-gas denitration system cannot maintain its performance. When the denitration catalyst is deteriorated, regeneration, replacement, or addition of the denitration catalyst is performed, and the denitration catalyst is altered as necessary. When the denitration catalyst is usable, the denitration catalyst is not replaced nor regenerated.

22 Claims, 14 Drawing Sheets

FOREIGN PATENT DOCUMENTS

| | | |
|---|---|---|
| JP | 01-242127 A | 9/1989 |
| JP | 04-338217 A | 11/1992 |
| JP | 4-338217 A | 11/1992 |
| JP | 10-109018 A | 4/1998 |
| JP | 2002-155737 A | 5/2002 |
| JP | 2002181180 A | 6/2002 |
| JP | 2005199108 A | 7/2005 |

* cited by examiner

FIG.8

UNIT: MILLION YEN

| YEAR | 14 | 15 | 16 | 17 | 18 | 19 | 20 | 21 | 22 | 23 | TOTAL | REMARKS |
|---|---|---|---|---|---|---|---|---|---|---|---|---|
| | 1 | 2 | 3 | 4 | 5 | 6 | 7 | 8 | 9 | 10 | | |
| REPLACEMENT WITH NEW CATALYST (A) | 685 THREE LAYERS | | | | | | | 685 ONE LAYER | | | 1,370 | REPLACEMENT PERFORMED TWICE |
| REPLACEMENT WITH REGENERATED CATALYST (B) | 80 THREE LAYERS | | | 80 ONE LAYER | | | 80 TWO LAYERS | | | 80 FOUR LAYERS | 320 | REPLACEMENT PERFORMED THREE TIMES |
| DIFFERENCE (A - B) | | | | | | | | | | | 1,050 | 105 MILLION/ YEAR |

FIG.10

MACHINE NO. 1 OF COMPANY A (BEFORE ADDITION)

| | |
|---|---|
| NO | 150 |
| $NH_3$ | 132 |
| $NH_3/NO$ | 0.88 |

AV=20.8 — 1001  PARTIAL DENITRATION RATIO 74.5%

| | |
|---|---|
| NO | 38.3 |
| $NH_3$ | 20.3 |
| $NH_3/NO$ | 0.53 |

AV=20.8 — 1002  PARTIAL DENITRATION RATIO 47.0%

| | |
|---|---|
| NO | 20.3 |
| $NH_3$ | 2.3 |

TOTAL DENITRATION RATIO 86.5%

FIG.11

**MACHINE NO. 1 OF COMPANY A
(ESTIMATION AFTER ADDITION)**

| | |
|---|---|
| NO | 150 |
| $NH_3$ | 132 |
| $NH_3/NO$ | 0.88 |

AV=61.0 —1101  PARTIAL DENITRATION RATIO 39.9%

| | |
|---|---|
| NO | 90.2 |
| $NH_3$ | 72.2 |
| $NH_3/NO$ | 0.80 |

AV=20.8 —1001  PARTIAL DENITRATION RATIO 70.7%

| | |
|---|---|
| NO | 26.4 |
| $NH_3$ | 8.4 |
| $NH_3/NO$ | 0.32 |

AV=20.8 —1002  PARTIAL DENITRATION RATIO 28.3%

| | |
|---|---|
| NO | 18.9 |
| $NH_3$ | 0.9 |

TOTAL DENITRATION RATIO 87.4%

METHOD AND APPARATUS FOR MANAGING DENITRATION CATALYST

TECHNICAL FIELD

The present invention relates to a method and an apparatus for managing a denitration catalyst, which is provided in an exhaust-gas denitration system in a thermal power station or the like, by grasping performance of the denitration catalyst, and by performing maintenance for the denitration catalyst depending on the performance.

BACKGROUND ART

A nitrogen oxide ($NO_x$) contained in exhaust gas in a thermal power station or the like using petroleum, coal, gas, or the like as a fuel is a typical air pollutant besides a sulfur oxide ($SO_x$) and particles of soot. Emission of $NO_x$ is regulated by laws. In such circumstances, an exhaust-gas denitration system is conventionally provided in a boiler in a thermal power station, a large-sized boiler of various types, other waste incinerators, or the like. The exhaust-gas denitration system includes a plurality of denitration catalyst layers.

As the denitration catalyst, a honeycomb type and or plate type denitration catalyst is used. If the denitration catalyst is continuously used, a matter that deteriorates a performance of the denitration catalyst adheres or melts out on a surface or inside of the denitration catalyst. This disadvantageously results in a deterioration of the performance of the denitration catalyst. Conventionally, the performance of the denitration catalyst is managed by measuring an [$NO_x$] concentration and an unreacted [$NH_3$] concentration at an inlet and an outlet. If overall performance is deteriorated, the catalysts are sequentially replaced with new catalysts in a descending order of service life on a periodic basis.

The conventional technique has, however, a disadvantage of an increased replacement cost since a denitration catalyst is very expensive. A degree of performance deterioration of the denitration catalyst depends on a manner of use of the exhaust-gas denitration system or a position at which the catalyst is used in the system. Due to this, replacement of even a usable denitration catalyst is sometimes conducted which is an inefficient replacement. In addition, according to an analysis of the applicant, the performance of the denitration catalyst is sometimes recovered by regeneration, which can eliminate the need for replacement.

The present invention has been achieved in view of above disadvantages (problems). It is an object of the present invention to provide a method and apparatus for managing a denitration catalyst that ensure efficient and cost-effective management of a denitration catalyst including regeneration and replacement thereof by comprehensively and intensively managing the denitration catalyst.

DISCLOSURE OF THE INVENTION

To solve the above problems, a method for managing a denitration catalyst according to the present invention is a method for managing a plurality of denitration catalysts in an exhaust-gas denitration system, and includes measuring a performance of the denitration catalysts separately for each of the denitration catalysts; and determining which process is to be performed, regeneration of the denitration catalysts or replacement of the denitration catalysts, or neither of the regeneration nor the replacement is performed, for each of the denitration catalysts based on the performance measured.

In the above invention, when it is determined to perform the regeneration, the determining includes selecting an optimum type of regeneration from among a plurality of types of regeneration processes.

Moreover, in the above invention, the method further includes replacing, when it is determined to perform the replacement, one of the denitration catalysts with a denitration catalyst that has been used in another exhaust-gas denitration system and that that has undergone regeneration.

Furthermore, in the above invention, the method further includes determining a charge amount to be collected, when it is determined to perform the regeneration, by acquiring an amount of money at a predetermined ratio to an amount of a difference between a cost required for the replacement and a cost required for the regeneration.

Moreover, in the above invention, the method further includes determining a charge amount to be collected from a user of the exhaust-gas denitration system based on a cost required for installation and management of the denitration catalysts.

Furthermore, in the above invention, the measuring includes measuring the performance of the denitration catalysts by checking an exhaust gas at an inlet and an outlet of each of the denitration catalysts in a daily management for the denitration catalysts.

Moreover, in the above invention, the measuring includes, in a periodic maintenance for the denitration catalysts, extracting a sample of each of the denitration catalysts, and measuring performance of the sample.

Furthermore, in the above invention, the method further includes altering, when it is determined to perform the replacement, a shape of a denitration catalyst to be replacement.

Moreover, in the above invention, the method further includes altering, when it is determined to perform the regeneration, a shape of a denitration catalyst to be regenerated.

Furthermore, in the above invention, the determining includes determining whether at least one of the regeneration, the replacement, and an addition of a new denitration catalyst is performed or none of the regeneration, the replacement, and the addition is performed, for each of the denitration catalysts based on the performance.

Moreover, in the above invention, the method further includes adding, when it is determined to perform the addition, a denitration catalyst that has been used in another exhaust-gas denitration system, and that has undergone regeneration.

Furthermore, in the above invention, the method further includes altering, when it is determined to perform the addition, a shape of a denitration catalyst to be added.

Moreover, a method for managing a denitration catalyst according to another invention is a method for managing a plurality of denitration catalysts in an exhaust-gas denitration system, and includes measuring performance of the denitration catalysts separately for each of the denitration catalysts; and determining execution timing for regeneration of the denitration catalysts and for replacement of the denitration catalysts, for each of the denitration catalysts based on the performance measured by the measuring unit.

In the above invention, the determining includes determining execution timing for addition of a new denitration catalyst for each of the denitration catalysts in addition to the execution timing for the regeneration and for the replacement.

Moreover, in the above invention, the performance is measured by checking an exhaust gas at an inlet and an outlet of each of the denitration catalysts in a daily management for the denitration catalysts.

Furthermore, in the above invention, the measuring includes, in a periodic maintenance for the denitration catalysts, extracting a sample of each of the denitration catalysts, and measuring performance of the sample.

Moreover, a method for managing a denitration catalyst according to still another invention is a method for managing a plurality of denitration catalysts in an exhaust-gas denitration system, and includes predicting performance of each of the denitration catalysts based on information on a scale and a n operation time of the exhaust-gas denitration system; and determining execution timing for regeneration of the denitration catalysts, for replacement of the denitration catalysts, and for addition of a new denitration catalyst based on the performance predicted at the predicting.

Furthermore, an apparatus for managing a denitration catalyst according to still another invention manages a plurality of denitration catalysts in an exhaust-gas denitration system, and includes a receiving unit that receives information on performance of each of the denitration catalysts that is measured by a measuring device provided in the exhaust-gas denitration system, through a network; a storage unit that stores the information on the performance of denitration catalysts received by the receiving unit; and a determining unit that determines which process is to be performed, regeneration of the denitration catalysts or replacement of the denitration catalysts, or neither of the regeneration nor the replacement is performed, for each of the denitration catalysts based on the information in the storage unit.

In the above invention, the determining unit determines whether at least one of the regeneration, the replacement, and an addition of a new denitration catalyst is performed, or none of the regeneration, the replacement, and the addition is performed, for each of the denitration catalysts based on the information in the storage unit.

Moreover, in the above invention, the determining unit determines execution timing for an addition of a new denitration catalyst for each of the denitration catalysts based on the information in the storage unit in addition to the execution timing for the regeneration and for the replacement.

Furthermore, an apparatus for managing a denitration catalyst according to still another invention manages a plurality of denitration catalysts in an exhaust-gas denitration system, and includes a storage unit that stores information on performance of a plurality of denitration catalysts of other exhaust-gas denitration system and information on execution timing for regeneration of the denitration catalysts, for replacement of the denitration catalysts, and for addition of a new denitration catalyst that are determined based on the information on the performance of the denitration catalysts in the other exhaust-gas denitration system; a input unit that accepts input of information on a scale and an operation time of the exhaust-gas denitration system; a predicting unit that predicts performance of each of the denitration catalysts in the exhaust-gas denitration system based on the information accepted by the input unit and the information stored in the storage unit; and a determining unit that determines execution timing for the regeneration, for the replacement, and for the addition for each of the denitration catalysts based on the performance predicted by the predicting unit.

According to the above aspects, the performance of the denitration catalysts are grasped for each denitration catalyst, and one of appropriate processings can be performed for each denitration catalyst depending on the performance grasped. It is, therefore, possible to efficiently and cost-effectively manage the denitration catalysts. The appropriate processings include the regeneration processing which is less expensive than the replacement of the catalyst with a new catalyst. Therefore, the performance of each denitration catalyst can be recovered to a performance substantially the same as a performance obtained by replacing the denitration catalyst with the new catalyst.

The execution timing of the replacement processing for the denitration catalysts is determined for each denitration catalyst. Therefore, by notifying the regeneration or replacement timing in advance, efficient measures for the processing can be taken. In addition, a plurality of denitration catalysts including those in the exhaust-gas denitration systems in the suspended or discontinued power stations are managed comprehensively and intensively using a network. It is, therefore, possible to facilitate management for more appropriate replacement of the denitration catalyst, and suppress total cost.

The denitration catalysts are rented out to facilities including the denitration systems such as the thermal power station or the waste incinerator. The periodic maintenance management and the daily management for rental denitration catalysts are executed to carry out the $NO_x$ treatment for the power station. In compensation for the managements and treatments, a rental fee calculated from the catalyst installation cost and the management cost can be collected. A long-term rental contract enables the user to take environmental measures at lower cost than that required to purchase the denitration catalysts.

BRIEF DESCRIPTION OF THE DRAWINGS

FIG. 8 is a schematic diagram for explaining a merit of regeneration of the denitration catalyst;

FIG. 10 is a schematic diagram for explaining a simulation example of an addition (increase) of a denitration catalyst;

FIG. 11 is a schematic diagram for explaining another simulation example of the addition (increase) of a denitration catalyst;

BEST MODE FOR CARRYING OUT THE INVENTION

Exemplary embodiments of a method and an apparatus for managing a denitration catalyst according to the present invention will be explained in detail with reference to the accompanying drawings.

(Outline of Method for Managing a Denitration Catalyst)

Figure 1:
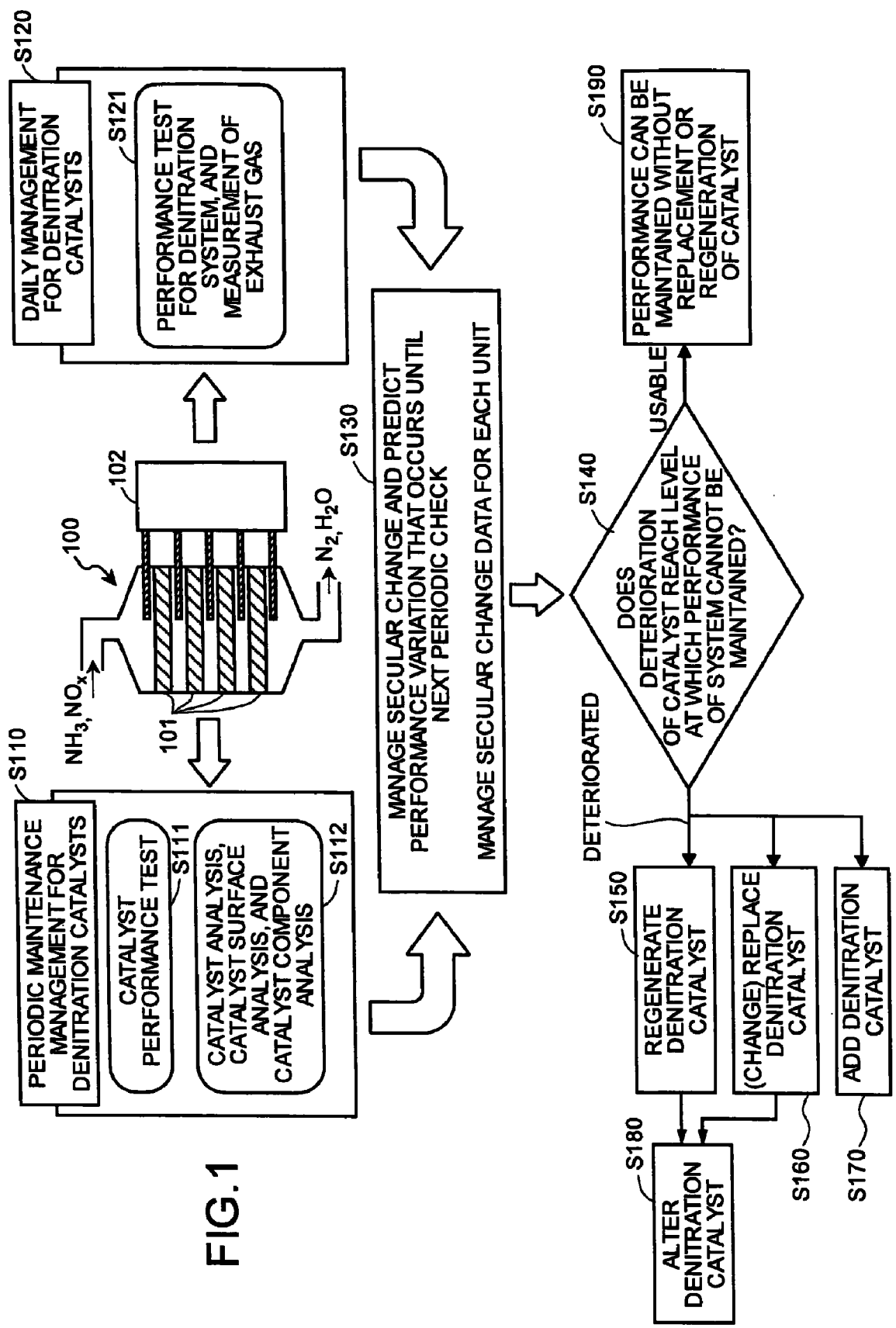
FIG. 1 is a schematic diagram for explaining an outline of a method for managing a denitration catalyst according to an embodiment of the present invention.

An outline of a method for managing a denitration catalyst according to an embodiment of the present invention will first be explained. FIG. 1 is a schematic diagram for explaining an outline of a method for managing a denitration catalyst according to the embodiment of the present invention. As shown in FIG. 1, at step S110, a periodic maintenance management for a plurality of denitration catalysts 101 in an exhaust-gas denitration system 100 is performed. At step S120, a daily management of the denitration catalysts 101 based on measurement values obtained by a measuring device 102 that measures performance of the respective denitration catalysts 101 is performed.

Based on data obtained by the periodic maintenance management (step S110) and the daily management (step S120), secular change data on the denitration catalysts 101 in each unit is managed. Thus, the secular change is managed and a performance variation prediction until a next periodic check is executed (step S130).

It is then determined whether a deterioration of each of the denitration catalysts 101 reaches a level at which the performance of the exhaust-gas denitration system 100 cannot be maintained (step S140). If it is determined that the denitration catalyst 101 is deteriorated ("deteriorated" at step S140), the denitration catalyst 101 is regenerated (step S150). Alternatively, the denitration catalyst 101 is exchanged (replaced) with a new one (step S160).

Further, a new denitration catalyst is added besides the denitration catalysts 101 (step S170). Alternatively, during regeneration at step S150 or exchange (replacement) at step S160, the denitration catalyst may be altered (step S180). Details of the denitration catalyst addition processing (step S170) and the denitration catalyst alteration processing (step S180) will be explained later.

If it is determined that the denitration catalyst 101 is usable ("usable" at step S140), the performance of the exhaust-gas denitration system 100 can be maintained without the need for the replacement or the regeneration of the denitration catalyst 101. No replacement or regeneration is performed, accordingly (step S190).

In the periodic maintenance management (step S110), a sample catalyst is extracted from each denitration catalyst layer in the exhaust-gas denitration system 100 in each power station. In addition, a catalyst performance test and a deterioration factor identification are carried out to the sample catalyst. More specifically, a performance test and a surface analysis are performed and evaluated for each sample catalyst. An execution target is each power station unit in which the exhaust-gas denitration system 100 is disposed. A measurement is made at each periodic check or during each long-term suspension of operation. It is thereby possible to accurately grasp a greatly deteriorated catalyst. Further, at a catalyst performance test (step S111), a denitration ratio, an $SO_2$ oxidization ratio, and the like are detected by the test.

Examples of a method for a catalyst analysis (step S112) include a catalyst surface analysis (using an X-ray microanalyzer) for measuring a deteriorated matter on the catalyst surface and grasping the performance deterioration, and a catalyst component analysis (an X-ray fluorescent analysis) for measuring the deteriorated matter accumulated in catalyst components and grasping the performance deterioration.

In the daily management (step S120), a performance test (exhaust gas measurement) for the exhaust-gas denitration system 100 is performed (step S121) at each power station. An execution target is each power station unit in which the exhaust-gas denitration system 100 is disposed, and an exhaust gas of each of the catalyst layers is measured. The measurement frequency is about once or twice per year. By thus grasping the performance of the respective layers, the greatly deteriorated catalyst layer is accurately grasped and efficiently regenerated.

The regeneration of the denitration catalyst 101 (step S150) specifically is regeneration of the deteriorated catalyst based on a secular performance variation prediction. At step S150, regeneration timing and a target catalyst (layer) are selected, and an optimum regeneration work is selected, prepared, and executed. Further, a regenerated catalyst activation test is performed thereby managing a performance recovery ratio.

By thus managing the performance of the denitration catalysts 101 in the exhaust-gas denitration system 100 for each denitration catalyst 101, and carrying out an appropriate processing for each denitration catalyst 101 based on a management result, the denitration catalysts 101 can be efficiently managed.

(Configuration of Denitration Catalyst Management System)

Figure 2:
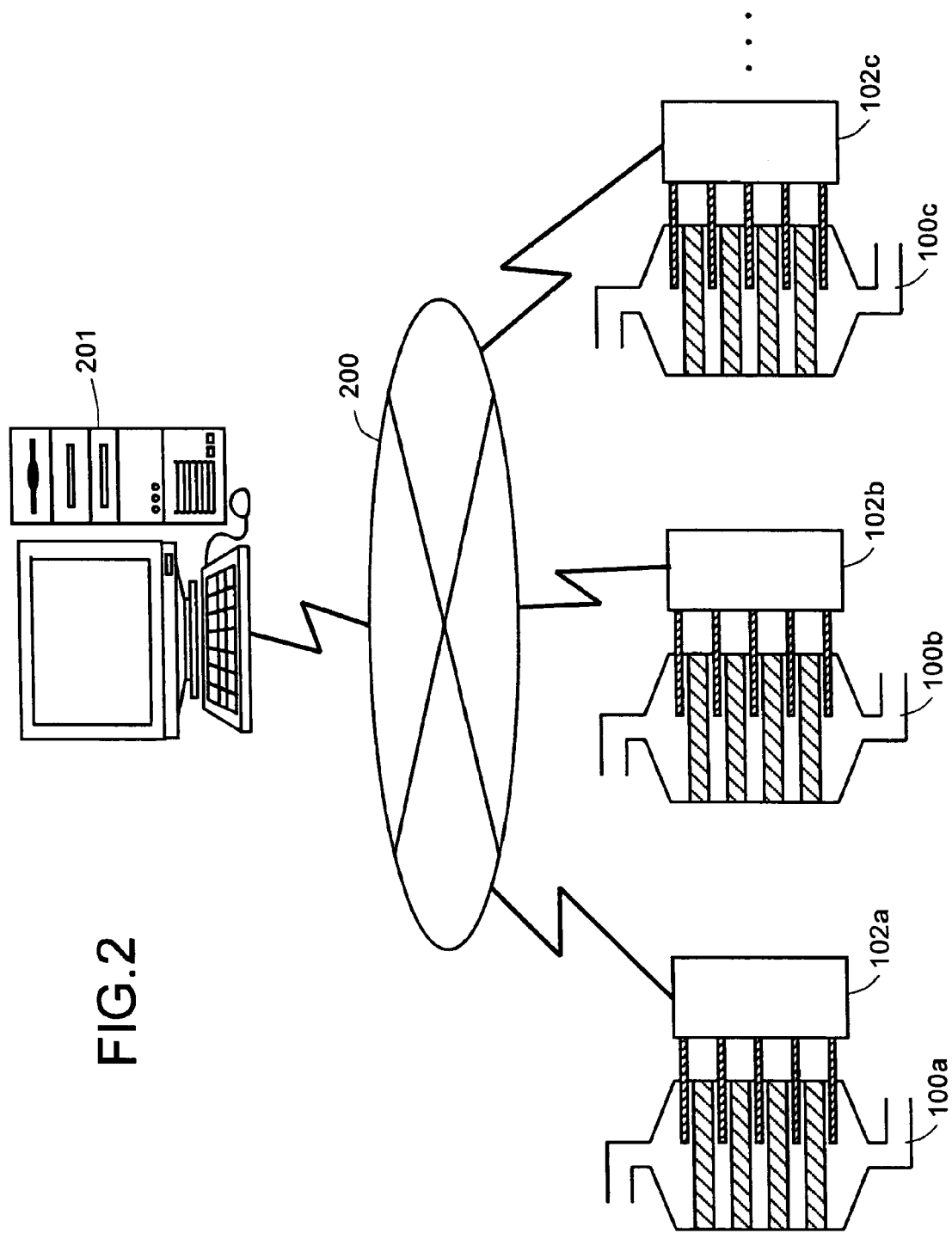
FIG. 2 is a schematic diagram for explaining a system configuration of a denitration catalyst management system including an apparatus for managing a denitration catalyst according to the embodiment of the present invention.

A system configuration of a denitration catalyst management system including an apparatus for managing a denitration catalyst according to the embodiment of the present invention will be explained. FIG. 2 is a schematic diagram for explaining a system configuration of the denitration catalyst management system including the apparatus for managing a denitration catalyst according to the embodiment of the present invention.

In FIG. 2, measuring devices 102a, 102b, 102c . . . respectively connected to exhaust-gas denitration systems 100a, 100b, 100c, . . . disposed in each of a plurality of power station units are connected to an apparatus for managing a denitration catalyst 201 serving as a centralized management center through a network 200 such as the Internet. The apparatus for managing a denitration catalyst 201 can, therefore, mutually communicate data with each of the measuring devices 102 through the network 200. In addition, the apparatus for managing a denitration catalyst 201 can receive information on the performance of the denitration catalysts 101 measured by each of the measuring devices 102 when necessary.

Further, the apparatus for managing a denitration catalyst 201 can transmit, to each of the measuring devices 102 or to an administrator of each of the exhaust-gas denitration systems 100, information on a timing of processings (a regeneration processing and a replacement processing) for each of the denitration catalysts 101 or the like, information on a charge amount required for management to be explained later, and the like.

(Configurations of Exhaust-Gas Denitration System and Measuring Device)

Figure 3:
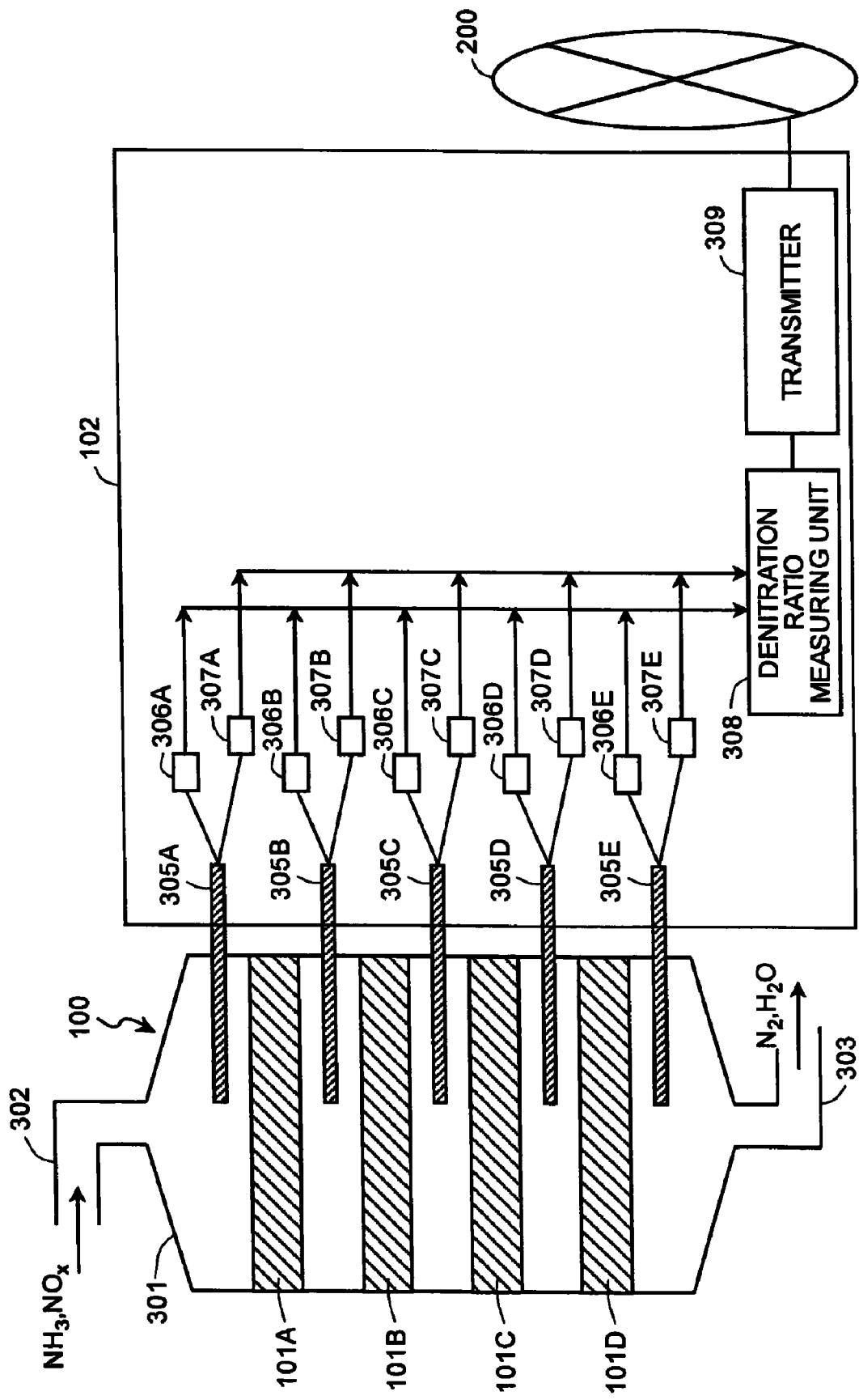
FIG. 3 is a schematic diagram of a configuration of an exhaust-gas denitration system and a measuring device.

Configurations of the exhaust-gas denitration system 100 and the measuring device 102 will be explained next. FIG. 3 is a schematic diagram of a configuration of the exhaust-gas denitration system and the configuration of the measuring device. While the exhaust-gas denitration system 100 is provided in the thermal power station, an installation location of the exhaust-gas denitration system 100 according to this embodiment is not limited to the thermal power station.

With reference to FIG. 3, the exhaust-gas denitration system 100 includes an exhaust duct 302 connected to an upstream side of a system main body 301 and communicating with a boiler device of the thermal power station and a processing gas duct 303 connected to a downstream side of the system main body 301. In the system main body 301, denitration catalysts 101A to 101D in a plurality of layers (four layers) are arranged at predetermined intervals. Each of the denitration catalysts 101A to 101D is provided in such a manner that an exhaust gas introduced from the exhaust duct 302 can be sequentially passed through the denitration catalysts 101A to 101D. Thus, each of the denitration catalyst 101 contacts with the exhaust gas having passed therethrough, and a nitrogen oxide ($NO_x$) contained in the exhaust gas can be reduced. Into the exhaust duct 302 communicating with the boiler device, $NH_3$ is injected depending on an amount of the exhaust gas from a boiler main body.

Types, shapes, and the like of each of the denitration catalysts 101A to 101D are not limited. Generally, $TiO_2$ is used as a carrier, $V_2O_5$ is used as an active component, and a honeycomb type, a plate type, or the like is used as a catalyst type. Alternatively, the denitration catalyst that contains $WO_3$ or $M_0O_3$ as a co-catalyst component may be used or the denitration catalyst that does not contain the co-catalyst component may be used. In this embodiment, honeycomb denitration catalysts are used and a plurality of columnar honeycomb type catalysts are arranged, thereby constituting each of the denitration catalysts 101A to 101D.

The measuring device 102 according to this embodiment is provided with gas extracting units 305A to 305E at inlets and outlets for each of the denitration catalysts 101A to 101D. The gas extracting units 305A to 305E are connected to [$NO_x$] concentration measuring units 306A to 306E and [$NH_3$] concentration measuring units 307A to 307E respectively. Information on measurement results obtained by the [$NO_x$] concentration measuring units 306A to 306E and the [$NH_3$] concentration measuring units 307A to 307E is transmitted to a denitration ratio measuring unit 308 that calculates a denitration ratio and a denitration burden ratio of each of the denitration catalysts 101A to 101D.

With such a configuration, the gas extracting units 305A to 305E extract sampling gases in desired amounts through sampling tubes at a desired timing, and supply the sampling gases extracted to the [$NO_x$] concentration measuring units 306A to 306E and the [$NH_3$] concentration measuring units 307A to 307E, respectively. In this embodiment, the gas extracting units 305A to 305E are configured to supply the extracted gases to the [$NO_x$] concentration measuring units 306A to 306E and the [$NH_3$] concentration measuring units 307A to 307E, respectively. Alternatively, the gas extracting units may be independently provided in the [$NO_x$] concentration measuring units 306A to 306E and the [$NH_3$] concentration measuring units 307A to 307E, respectively.

The sampling gas extraction timing at which the gas extracting units 305A to 305E extract the sampling gases is not specifically limited. However, the extraction is performed preferably during a normal operation of the corresponding power station, more preferably during a rated load time at which the amount of gas reaches a maximum. As for the catalyst layers on a downstream side, in particular, each [$NH_3$] concentration is reduced and a fluctuation width of the [$NH_3$] concentration increases. In order to improve a management evaluation, therefore, it is preferable to increase the number of times of measuring the [$NH_3$] concentration and to calculate the denitration ratio from an average concentration. Alternatively, the number of times of measuring the [$NH_3$] concentration may be changed for each denitration catalyst.

The [$NO_x$] concentration measuring units 306A to 306E and the [$NH_3$] concentration measuring units 307A to 307E are not specifically limited as long as they measure the [$NO_x$] concentrations and the [$NH_3$] concentrations in the sampling gases, respectively. Sensors that measure the [$NO_x$] concentrations and the [$NH_3$] concentrations may be used, and each sampling gas may be extracted either by an automatic measuring device or manually, and the extracted sampling gas may be analyzed. As for the sampling gas, concentrations of oxygen and other components may be measured besides the [$NO_x$] concentration and the [$NH_3$] concentration when necessary.

While the measuring units are provided independently to measure concentrations at each of the inlets and the outlets of each of the denitration catalysts 101A to 101D, one unit of the [$NO_x$] concentration measuring unit and one unit of the [$NH_3$] concentration measuring unit may be provided to sequentially analyze concentrations at the inlets and the outlets of the denitration catalysts 101A to 101D.

The denitration ratio measuring unit 308 acquires measurement results from the [$NO_x$] concentration measuring units 306A to 306E and the [$NH_3$] concentration measuring units 307A to 307E, and calculates denitration ratios and denitration burden ratios of the respective denitration catalysts 101A to 101D from these measurement results. Functions of the denitration ratio measuring unit 308 are realized by, for example, making a CPU execute programs stored in a ROM, a RAM, a hard disk or the like, not shown.

A denitration ratio calculating method is not specifically limited as long as the method uses an inlet mole ratio, which is defined as (inlet mole ratio)=(inlet $NH_3$/inlet $NO_x$) to calculate the denitration ratio for each of the denitration catalysts 101A to 101D. The reason for considering the inlet mole ratio is as follows. Since $NH_3$ is injected just before injection of the denitration catalyst in proportion to an amount of gas and absorption of $NH_3$ to the catalyst is a rate-determining reaction of a denitration reaction itself, it is necessary to grasp and consider the $NH_3$ concentration of each of the denitration catalysts 101A to 101D at the inlet and the outlet therefor. To calculate the denitration ratio in consideration of the inlet mole ratio, the ratio may be calculated based on either $NO_x$ or $NH_3$. However, if the denitration ratio is calculated based on $NH_3$, the denitration ratio can be managed more accurately.

Exemplary procedures for calculating the denitration ratio will now be explained. The following equation (1) is used for calculating a denitration ratio $\eta$ based on the [$NO_x$] concentration.

$$\eta = \frac{(\text{inlet } NO_x - \text{outlet } NO_x)}{\text{inlet } NO_x} \times 100 \times \frac{\text{evaluation mole ratio}}{\text{inlet mole ratio}} \qquad \text{equation (1)}$$

In the equation (1), the evaluation mole ratio is set to evaluate the denitration catalyst and can be set at an appropriate mole ratio, for example, at about an operational mole ratio of the power station, e.g., 0.8. The denitration ratio $\eta$ obtained from the equation (1) is calculated based on the [NOx] concentration. Since the inlet mole ratio is considered in the equation (1), the catalyst can be evaluated based on the practical denitration ratio.

The following equation (2) is used for calculating the denitration ratio η based on the NH₃ concentration.

$$\eta = \frac{(\text{inlet NH}_3 - \text{outlet NH}_3)}{(\text{inlet NH}_3 - \text{outlet NH}_3 + \text{outlet NO}_x)} \times 100 \times \frac{\text{evaluation mole ratio}}{\text{inlet mole ratio}} \quad \text{equation (2)}$$

The denitration ratio η obtained from the equation (2) is calculated based on the [NH₃] concentration, and a more stable numeric value of the denitration ratio can be advantageously obtained than that calculated based on the $NO_R$. Therefore, the evaluation of the catalyst can be more stably performed.

A transmitter 309 transmits measurement data obtained by the denitration ratio measuring unit 308 to the apparatus for managing a denitration catalyst 201 through the network 200. Functions of the transmitter 309 are realized with, for example, an interface such as a modem, not shown.

Thus, by monitoring the denitration performance of the respective denitration catalyst layers at a real time and predicting future performance thereof from secular performance variations, the operational information can be appropriately provided to a catalyst user. Alternatively, the $NO_x$ measurement results obtained by an already disposed online chemiluminescent analyzer or the like can be transmitted through the network shown in FIG. 2.

Likewise, as for NH₃, measurement data obtained by a device that oxidizes NH₃ (ammonia) into NO and that measures the converted NO by chemiluminescence or the like using an indirect measuring method, a device using an infrared or ultraviolet absorption method that is a direct measuring method for directly measuring gaseous ammonia, a device using a measurement method in conformity to JIS for directly measuring gaseous ammonia or ammonia adhering to dust, an automatic analyzer in conformity to JIS, or the like can be transmitted. In the measurement of ammonia for the management of the denitration system, it is necessary to grasp all unreacted ammonias (denitration system leak ammonias) for injected ammonias so as to confirm emission and absorption of substances. It is, therefore, necessary to measure not only the gaseous ammonia but also the ammonia adhering to dust.

The transmitted measurement data is centralized and managed by the apparatus for managing a denitration catalyst 201 serving as a data management center. The performance of the respective layers can be grasped and managed by calculating the denitration ratios in consideration of ammonia/[$NO_x$] concentrations since a reaction ratio changes according to a ratio of ammonia to [$NO_x$] concentrations in the management. The measurement may be made once or more per day.

In this manner, the management of the performance of the entire denitration systems and the prediction of the future performance thereof can be performed. In addition, performance management for each catalyst layer and specification of the catalyst layer exhibiting the greatest deterioration can be performed as a daily management.

(Functional Configuration of Apparatus for Managing a Denitration Catalyst)

Figure 4:
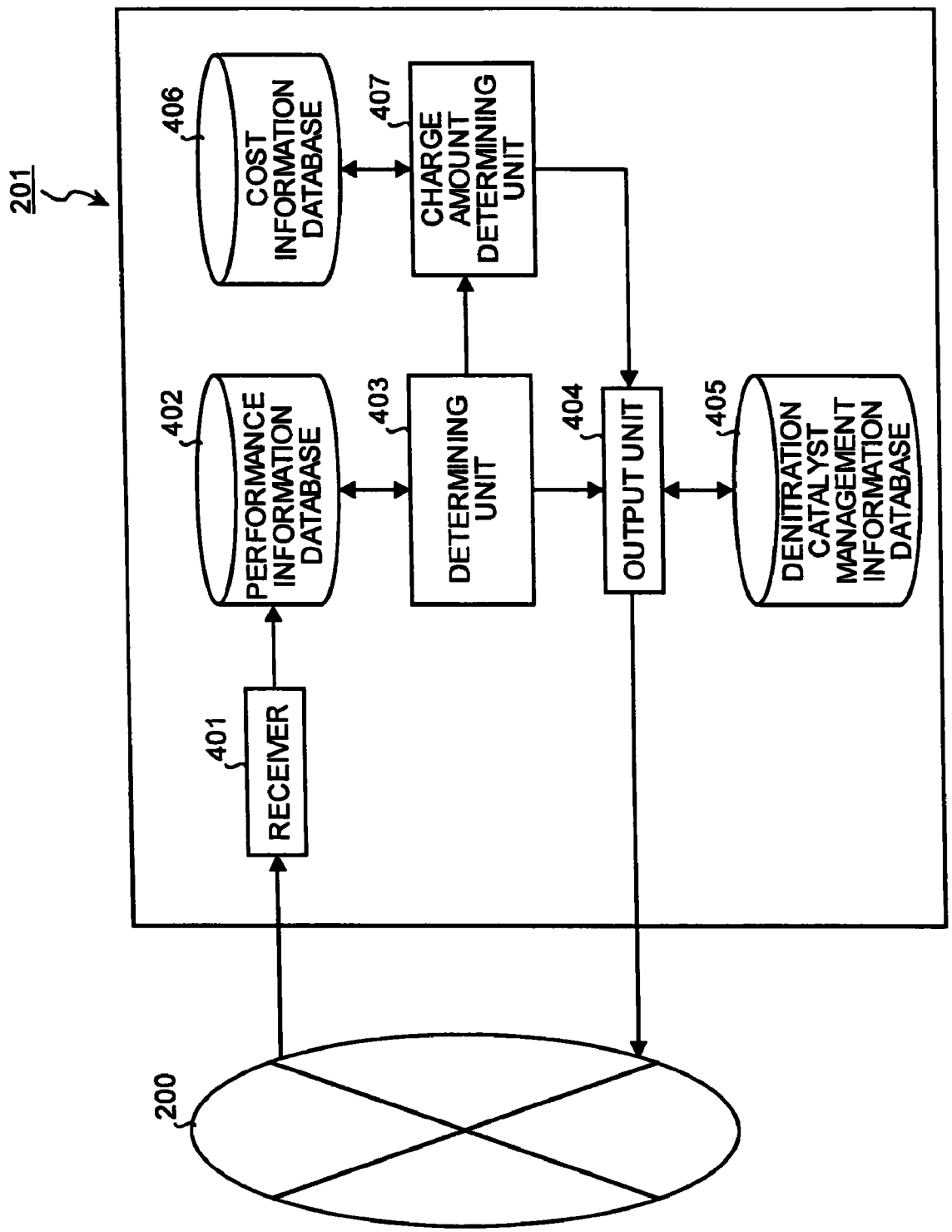
FIG. 4 is a schematic diagram of a functional configuration of the apparatus for managing a denitration catalyst according to the embodiment of the present invention.

A functional configuration of the apparatus for managing a denitration catalyst according to this embodiment of the present invention will be explained next. FIG. 4 is a schematic diagram of a functional configuration of the apparatus for managing a denitration catalyst according to the embodiment of the present invention. As shown in FIG. 4, the apparatus for managing a denitration catalyst 201 includes a receiver 401, a performance information database 402, a determining unit 403, an output unit 404, a denitration catalyst management information database 405, a cost information database 406, and a charge amount determining unit 407.

The receiver 401 receives measurement data (i.e., information on the performance of the denitration catalyst 101) transmitted from the measuring device 102, more specifically, from the transmitter 309 of the measuring device 102 shown in FIG. 3, through the network 200. Functions of the receiver 401 are realized by the interface such as the modem, not shown.

The performance information database 402 stores the measurement data received by the receiver 401 for each of the denitration catalysts 101 in each of the exhaust-gas denitration system 100. The data stored in the performance information database 402 includes not only the measurement data received by the receiver 401 but also data on a utilization status of each of the denitration catalysts 101 (a history as to which layer of the exhaust-gas denitration system 100 the denitration catalyst 101 is used as, when, how often, and by what method the denitration catalyst 101 is regenerated, and the like). Functions of the performance information database 402 are realized with, for example, a recording medium such as a hard disk, not shown.

The determining unit 403 determines which processing is performed for the denitration catalyst 101, the regeneration processing or the replacement processing, or whether none of the regeneration processing and the replacement processing are performed for each denitration catalyst 101 based on the information relating on the performance of the denitration catalyst 101 stored in the performance information database 402. Further, the determining unit 403 selects an optimum regeneration processing from among a plurality of types of regeneration processings if determining that the regeneration processing for the denitration catalyst 101 is performed. Detailed procedures in relation to the determination and the selection of the optimum regeneration processing will be explained later.

If determining that the replacement processing is performed, the determining unit 403 can determine whether the denitration catalyst 101 is replaced with a denitration catalyst that has been used in an exhaust-gas denitration system other than the determination target exhaust-gas denitration system 100 and that has been subjected to the regeneration processing. Thus, used denitration catalysts used in a power station, of which an operation has been suspended for a long period of time, or which has been discontinued, are collected and subjected to the regeneration processing, and the resultant denitration catalysts are stored. The stored denitration catalyst can be sold at a lower price than that of a new one in response to a demand therefor.

When determining that the replacement processing is performed, the determining unit 403 can also determine whether to alter the shape of the replacement target denitration catalyst. When determining that the regeneration processing is performed, the determining unit 403 can also determine whether to alter the shape of the regeneration target denitration catalyst 101.

The determining unit 403 further determines whether at least one of the regeneration processing for the denitration catalyst 101, the replacement processing for the denitration catalyst 101, or the addition processing for adding a new denitration catalyst is performed or whether none of the processings are performed, based on the information on the performance of the denitration catalyst 101 stored in the performance information database 402. When determining that the addition processing is performed, the determining unit 403 can also determine whether to add the denitration catalyst that has been used in another exhaust-gas denitration system and that has been subjected to the regeneration processing. Furthermore, when determining that the addition processing is performed, the determining unit 403 may determine whether to alter the shape of the addition target denitration catalyst.

The determining unit 403 determines the execution timing of the regeneration processing for each denitration catalyst 101 or the replacement processing therefor based on the information on the performance of the denitration catalyst 101 stored in the performance information database 402 for each denitration catalyst. Alternatively, the determining unit 403 may determine the execution timing of the regeneration processing for the denitration catalyst 101, the replacement processing therefor, or the addition processing for the new denitration catalyst based on the information on the performance of the denitration catalyst 101 stored in the performance information database 402 for each denitration catalyst.

Functions of the determining unit 403 are realized by making the CPU execute programs stored in, for example, the ROM, the RAM, or the hard disk, not shown.

The output unit 404 registers results obtained by the determining unit 403 in the denitration catalyst management information database 405 or transmits them to a predetermined transmission destination through the network 200. The charge amount determining unit 407 registers and transmits information on a determined charge amount. Functions of the output unit 404 are realized by making the CPU execute programs stored in, for example, the ROM, the RAM, or the hard disk, not shown, or by the interface such as the modem, not shown.

The denitration catalyst management information database 405 registers and manages, as denitration catalyst management information, the results obtained by the determining unit 403 for each denitration catalyst 101. Functions of the denitration catalyst management information database 405 are realized with, for example, the recording medium such as the hard disk, not shown.

The cost information database 406 stores information on costs required for the regeneration processing and the replacement processing. Functions of the cost information database 406 are realized with, for example, the recording medium such as the hard disk, not shown.

The charge amount determining unit 407 determines, as a charge amount, an amount of money at a predetermined ratio to a difference between the cost required for the replacement processing and the cost required for the regeneration processing, if the determining unit 403 determines that the regeneration processing is performed. A new accounting system that checks for a deterioration status of the denitration catalyst and that charges a client that desires performance assurance with a cost according to a deterioration factor, a deterioration degree, or the like can be constituted.

Alternatively, the charge amount determining unit 407 may determine the charge amount from a user of the exhaust-gas denitration system based on costs required for an installation processing for the denitration catalysts and the management thereof. Specifically, the charge amount determining unit 407 determines the charge amount by, for example, multiplying the costs by a predetermined coefficient. It is thereby possible to rent out denitration catalysts to facilities such as a thermal power station or a waste incinerator having denitration systems, execute the periodic maintenance management and the daily management to perform an $NO_x$ treatment for the power station, and collect a rental fee calculated from the catalyst installation cost and the management cost for the processing.

As a result, a long-term rental contract enables the user to take environmental measures at lower cost than that required to purchase the denitration catalysts. Functions of the charge amount determining unit 407 are realized by, for example, making the CPU execute programs stored in the ROM, the RAM, or the hard disk, not shown.

(Periodic Maintenance Management)

A detail of the periodic maintenance management for the denitration catalysts 101 will be explained next. The "periodic maintenance" refers to a periodic check or a long-term suspension of operation. Real denitration catalysts are extracted from those within the exhaust-gas denitration system 100 during the periodic maintenance, and the performance of each denitration catalyst 101 is checked. The performance of the denitration catalyst is the denitration ratio, or an $SO_2$ oxidization ratio or an $SO_3$ conversion ratio (hereinafter, "$SO_2$ oxidation ratio"). By thus checking the performance of the denitration catalyst 101, a deterioration factor for the denitration catalyst 101 is grasped. In addition, a deteriorated region within one unit of the denitration catalyst 101 is also grasped.

Various methods and devices for the performance test of each denitration catalyst 101 are known and the present invention is not limited to any specific method or any specific device therefor. A purpose of grasping the performance of the denitration catalyst 101 is to grasp the denitration ratio or the $SO_2$ oxidation ratio under ideal or standard conditions. If it is grasped, a performance deterioration caused by the catalyst itself can be determined. In the actual exhaust-gas denitration system 100, the performance quality sometimes depends on various factors. Examples of the various factors include gas properties of dust, an injection state of $NH_3$ serving as a reducer, and a gas flow. The measured performance of the denitration catalyst 101 enables estimating the catalyst performance in the actual system by adjusting an AV (area velocity), an LV (linear velocity), or the like to the actual system.

The AV [m/h ($m^3N/m^2/h$)] can be expressed as $$AV = G/A,$$

where "G" is a processing gas amount [$m^3N/h$] and "A" is a surface area [$m^2$] in a catalyst pore.

In addition, the LV [m/s] can be expressed as $$LV = Q/S,$$

where "Q" is a gas amount [$m^3/s$] at a processing temperature and "S" is a cross sectional area of a gas inlet before entry of the gas into the catalyst layer.

Experiments and analyses conducted by the applicant show that the used denitration catalyst 101 tends to be deteriorated only on the gas inlet side thereof. The experiments and the analyses conducted by the applicant also show that the performance of one catalyst (a length of 400 millimeters (mm) to 1,000 mm) is dominated by the performance of a part of the catalyst up to 300 mm from the inlet, and that a catalyst equal to or longer than 600 mm in a present state is disposed of without using a part (equal to or more than a half) of the catalyst irrelevant to the performance. Therefore, it is preferable to consider an optimum length of each of the catalysts to be used when the denitration system is designed or the real system predicts the performance of the catalyst.

Thus, grasping the deteriorated region within one unit of the denitration catalyst 101, it is found that the deterioration is significant on the gas inlet side of the denitration catalyst 101, and a portion of the denitration catalyst 101 on the outlet side remains in good condition. By thus grasping the deterioration factor for the denitration catalyst 101, a daily management performance evaluation and a future performance prediction for each denitration catalyst layer can be complemented.

(Determination of Deteriorated Layer of Denitration Catalyst)

Figure 5:
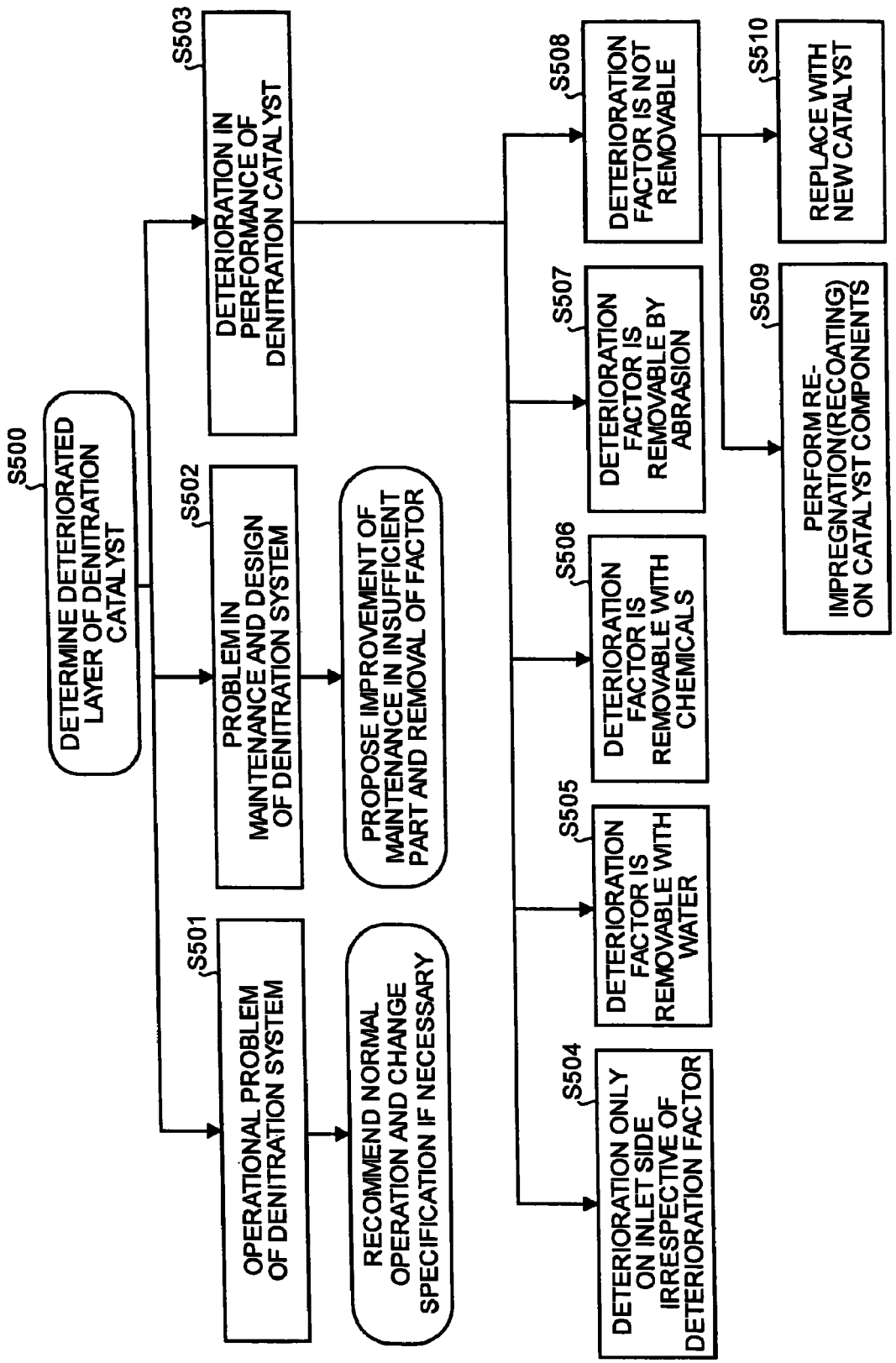
FIG. 5 is a schematic diagram for explaining details of determination for a denitration catalyst layer, which is deteriorated, in the method for managing a denitration catalyst according to the embodiment of the present invention.

A detail of a determination of a deteriorated layer of the denitration catalyst 101 will be explained next. FIG. 5 is a schematic diagram for explaining details of determination for a denitration catalyst layer, which is deteriorated, in the method for managing a denitration catalyst according to the embodiment of the present invention.

Figure 6:
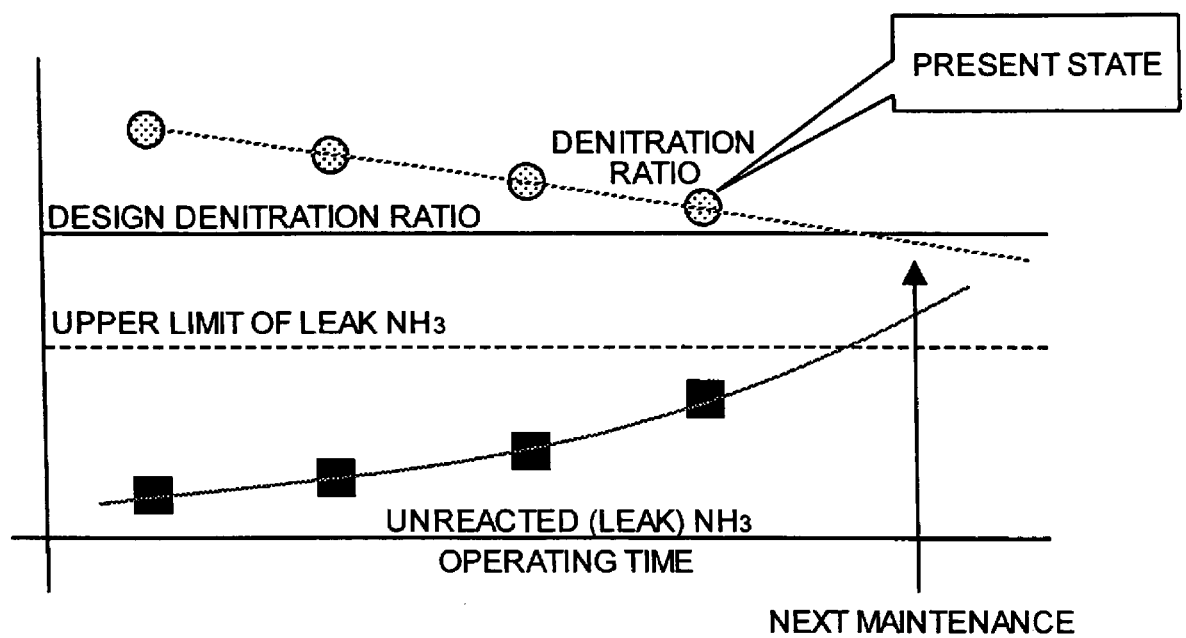
FIG. 6 is a schematic diagram (graph) for explaining a change in a design denitration ratio to an operating time and a change in unreacted (leak) $NH_3$.

As shown in FIG. 5, when the exhaust-gas denitration system 100 is further deteriorated, deterioration level of the system 100 or the most deteriorated layer is determined based on the performance of the catalyst of each layer extracted at the previous periodic maintenance and the performance of each layer obtained by gas measurement (daily management) using a graph shown in FIG. 6 or the like (step S500). FIG. 6 is a schematic diagram (graph) for explaining a change in a design denitration ratio to an operating time and a change in an unreacted (leak) $NH_3$.

When a result of the determination at step S500 indicates that the deterioration is due to an operational problem of the exhaust-gas denitration system (step S501), a normal operation is recommended or a specification change is recommended if necessary. The operational problem is, for example, a use of the exhaust-gas denitration system 100 under conditions exceeding a design specification thereof, a use of the exhaust-gas denitration system 100 at a mole ratio exceeding a design $NH_3/NO_x$ (mole ratio), and a use of the exhaust-gas denitration system 100 without modifying operation to be suitable for a fuel changed (change from low sulfur fuel oil to high sulfur fuel oil).

When the determination result at step S500 indicates that the deterioration is due to a problem in maintenance and design of the denitration system (step S502), for example, insufficient maintenance for the exhaust-gas denitration system 100, deficiency in the specification or design of the catalyst components of the denitration catalyst 101, then improvement of maintenance in a part at which maintenance is insufficient, and removal of such factor are proposed. The insufficient maintenance for the exhaust-gas denitration system 100 is, for example, insufficient injection of $NH_3$ (because of nozzle clogging or the like), a reduction in a reactive area due to accumulation of dust caused by a gas flow rate flow change, and erosion. The deficiency in the specification or design of the catalyst components of the denitration catalyst 101, is for example, a failure to select the catalyst components suitable for the processing exhaust gas, and the dust clogging due to arrangement of the catalysts (pileup of the honeycomb type catalysts).

One of the proposals for the improvement of the insufficient maintenance part and the removal of the factor may be made for of an optimum catalyst length (about 300 to 500 mm for a honeycomb catalyst at a pitch of 7 mm), in view of the fact that the current SV-base design often results in an over-specification.

When the determination result at step S500 indicates that the deterioration is caused by deterioration in the performance of the denitration catalyst (step S503), the regeneration processing is performed (steps S504 to S508) with a view of removing the deterioration factor. As the regeneration processing, if only the inlet side is deteriorated irrespectively of the deterioration factor (step S504), the deteriorated catalyst layer is reset by reversing a gas flow direction, whereby the deteriorated catalyst layer can be removed. Alternatively, a deteriorated region may be removed (cut off or separated) and the catalyst layer may be then reset.

If the deterioration factor is removable with water (step S505), the deteriorated denitration catalyst layer is washed and regenerated, and then reset. If the denitration catalyst 101 is physically fragile, the denitration catalyst layer may be washed and regenerated while the denitration catalyst layer is set within the exhaust-gas denitration system 100.

The regeneration processing executed at steps S504 and S505 is explained in detail in the patent application already filed by the present applicant and entitled "Denitration Catalyst Regeneration Method" (Japanese Patent Application Laid-open No. 2002-181180, filed on Jun. 21, 2002).

When the deterioration factor is removable with chemicals (step S506), that is, if the deterioration factor (for example, vanadium) is not removable with water, the deterioration factor is cleaned and regenerated using chemicals such as oxalic acid. Further, after the cleaning with the chemicals, the deterioration factor may be dried or heated so as to recover the performance of the catalyst. In addition, treatments for generated waste liquid and waste matter are executed.

If the deterioration factor is removable by abrasion (step S507), that is, the deterioration factor is not removable with the washing or chemical treatment, the catalyst surface is abraded and regenerated using an abrasive or abrasive grains. However, it is noted that because this method entails a physical wear by scraping the catalyst itself, is not suitable for repeated regeneration.

If the deterioration factor is not removable (step S508), the catalyst components are subjected to re-impregnation (re-coating) (step S509). That is, the deteriorated catalyst is not disposed of but is kept as it is or crushed down, and the catalyst components are re-adjusted, thereby regenerating and reusing them.

Alternatively, when the deterioration factor is not removable (step S508), the deteriorated catalyst is replaced with a new catalyst (step S510). In other words, if not reusable, the deteriorated catalyst is disposed of and is replaced with a new catalyst. It is noted, however, that the length of the catalyst is adjusted to be optimum and a replacing catalyst is provided to the user at a low price.

(Performance Prediction)

Figure 7:
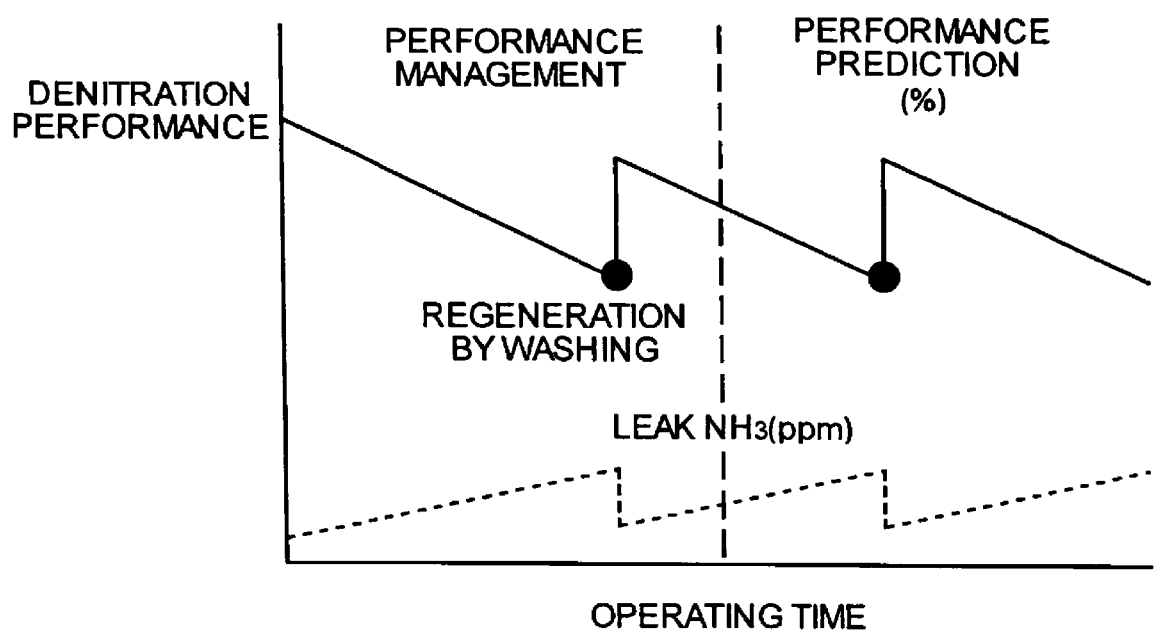
FIG. 7 is a schematic diagram (graph) for explaining secular change management and performance variation prediction.

FIG. 7 is a schematic diagram (graph) for explaining secular change management and performance variation prediction. As shown in FIG. 7, the apparatus for managing a denitration catalyst 201 manages the secular change in the information on the performance of each of the denitration catalysts 101 including information on the leak $NH_3$, whereby the device 201 can make a future performance prediction. In addition, the device 201 can determine execution timing for the regeneration processing for the denitration catalysts 101 or execution timing for the replacement processing for each of the denitration catalyst 101.

(Merit of Employing Regenerated Denitration Catalyst)

A merit of employing the regenerated denitration catalyst 101 will be explained next. FIG. 8 is a schematic diagram for explaining a merit of regeneration of the denitration catalyst 101. A predicted merit when the denitration catalysts are replaced with regenerated catalysts instead of a new catalyst is shown in FIG. 8.

Conditions are as follows. A power station output is 500 megawatts. A catalyst amount is about 724 cubic meters (181 $m^3$/layer). The number of catalyst layers is 4. The number of catalysts is 37,440 (9,360 catalysts/layer), and a catalyst unit price is 3 million to 4 million yen. As shown in FIG. 8, if a deteriorated catalyst replacement pattern is assumed, a merit of about 100 million yen/year per unit is predicted for a ten-year balance. Even if costs of the daily management (5 million yen/year per unit) and the cost for catalyst performance check (10 million yen/2 years per unit) during the periodic maintenances are subtracted from the merit, a merit of about 90 million yen/year per unit is predicted.

(Denitration Catalyst Addition Processing)

Figure 9:
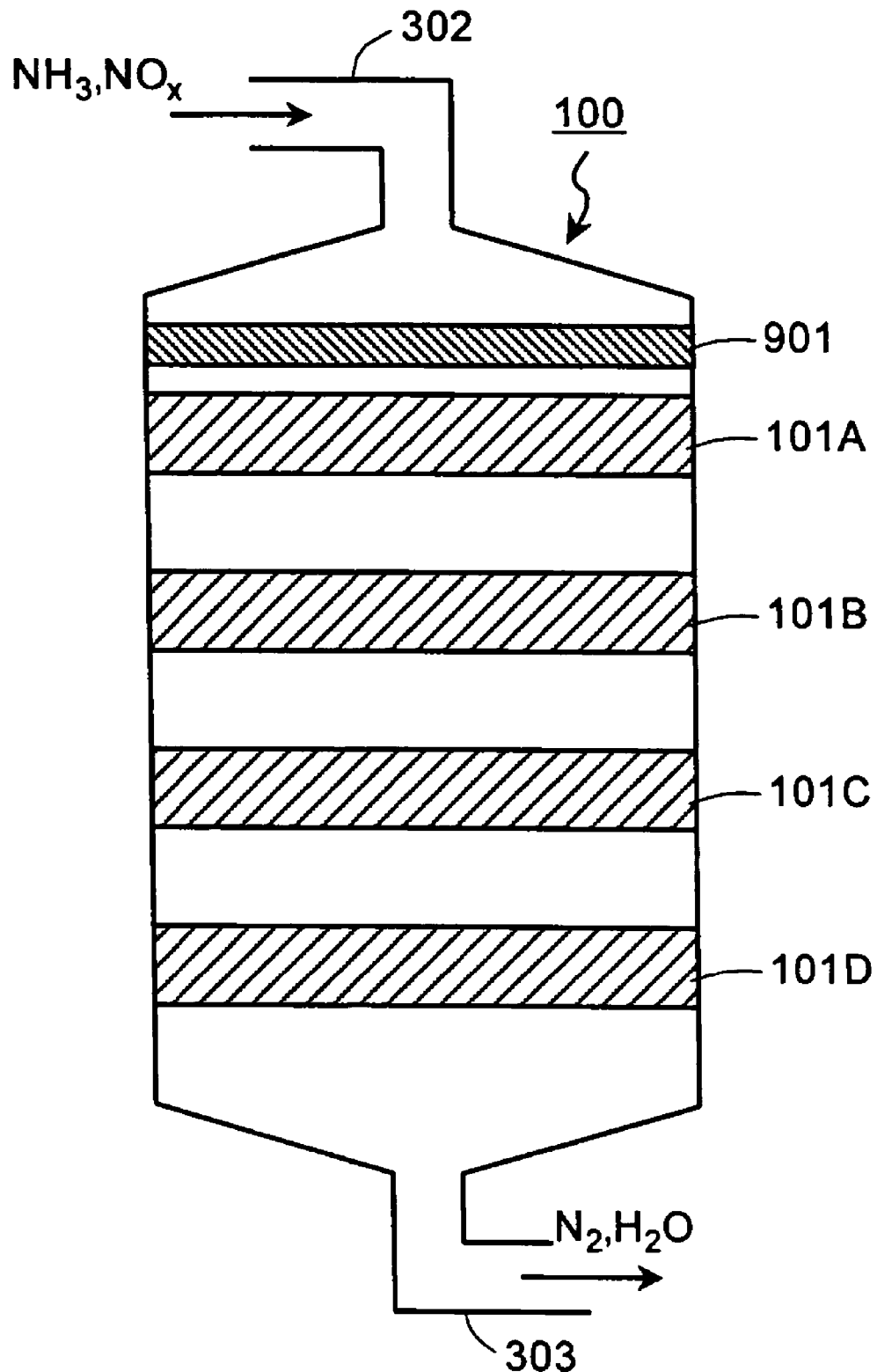
FIG. 9 is a schematic diagram of another configuration of the exhaust-gas denitration system.

A detail of an addition processing of a denitration catalyst will be explained next. FIG. 9 is a schematic diagram of another configuration of the exhaust-gas denitration system. As compared with the exhaust-gas denitration system 100 shown in FIG. 3, the exhaust-gas denitration system 100 shown in FIG. 9 is provided with a new denitration catalyst 901 above the denitration catalyst 101A. By thus providing the new denitration catalyst 901 besides the already provided denitration catalysts 101A to 101D, a processing performance of the exhaust-gas denitration system 100 can be improved without performing the replacement processing or the regeneration processing for the denitration catalysts 101A to 101D.

Alternatively, the addition processing may be performed together with the replacement processing or the regeneration processing for the denitration catalysts 101A to 101D. In an example shown in FIG. 9, the added denitration catalyst 901 is installed above the denitration catalyst 101A. However, an installation location is not limited thereto. The added denitration catalyst 901 may be, therefore, provided below the denitration catalyst 101D or between the denitration catalysts, for example. In the example shown in FIG. 9, the number of the denitration catalyst 901 to be added is just one. However, the number of the denitration catalysts 901 is not limited to one and may be two or more.

FIGS. 10 and 11 are schematic diagrams for explaining a simulation example of an addition (increase) of the denitration catalyst. In FIGS. 10 and 11, an example of adding a denitration catalyst 1101 above denitration catalysts 1001 and 1002 is shown. By adding the denitration catalyst 1101, "NO" is reduced from '20.3' to '18.9', "NH$_3$" is reduced from '2.3' to '0.9', and "total denitration ratio" is improved from '86.5%' to '87.4%'. By showing the example shown in FIGS. 10 and 11 to the user, an effect of the denitration catalyst addition processing can be clearly displayed.

(Denitration Catalyst Alteration Processing)

Figure 12:
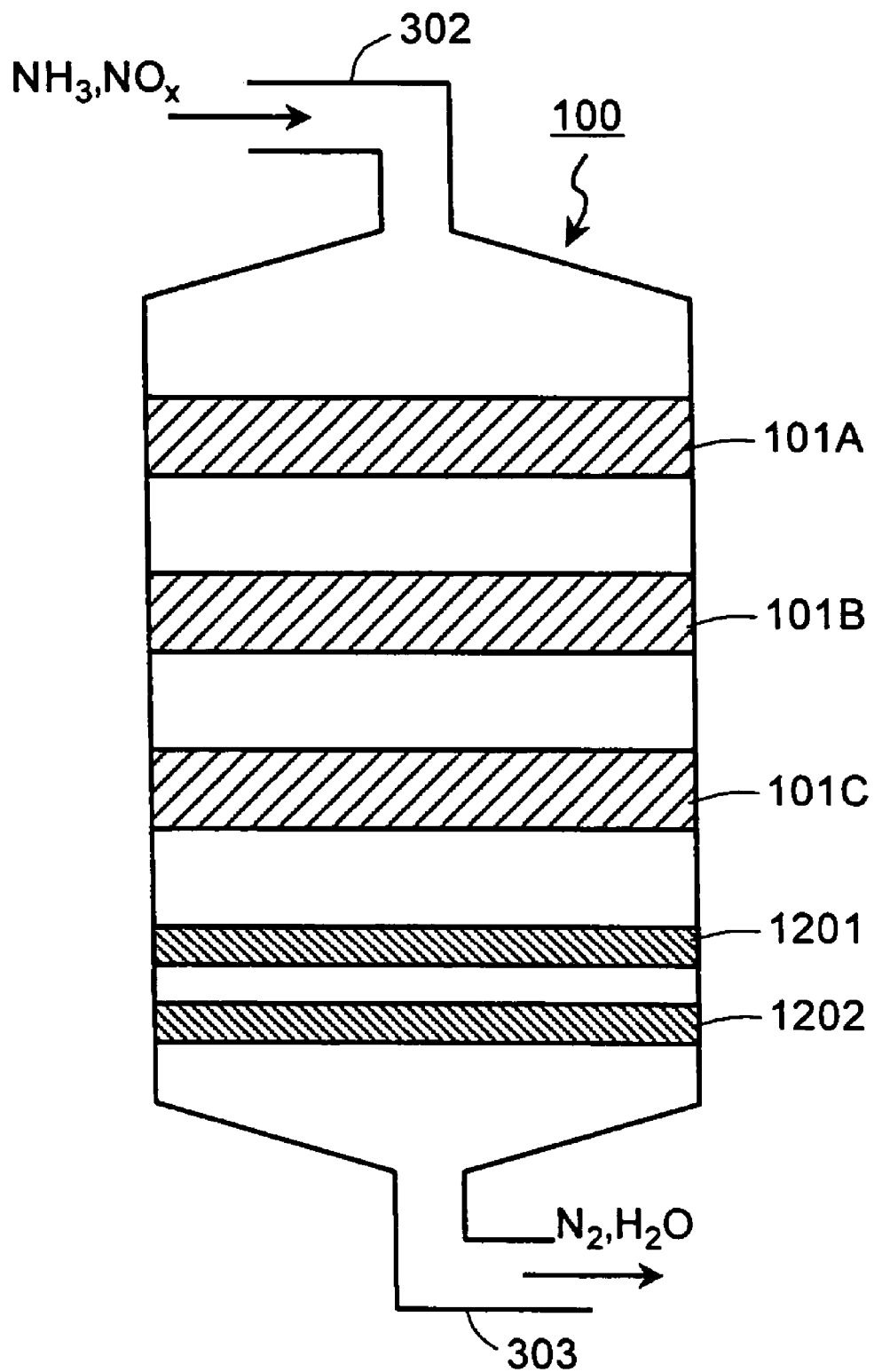
FIG. 12 is a schematic diagram of still another configuration of the exhaust-gas denitration system.
Figure 13:
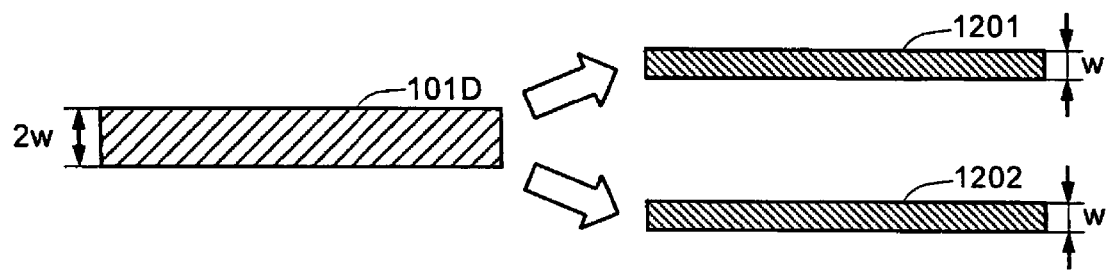
FIG. 13 is a schematic diagram for explaining an alteration processing for the denitration catalyst.
Figure 14:
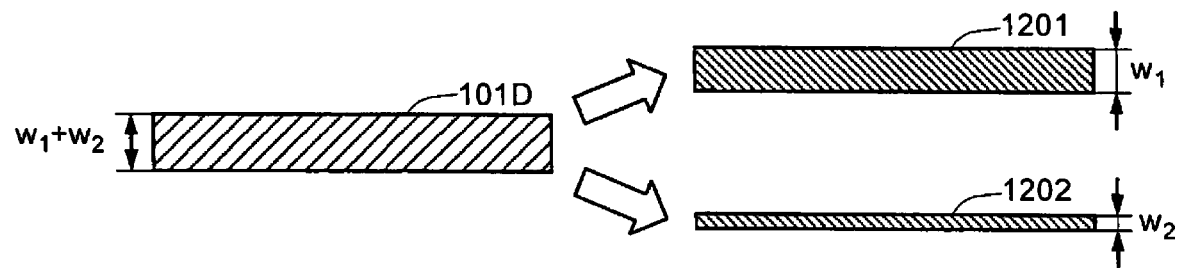
FIG. 14 is a schematic diagram for explaining another alteration processing for the denitration catalyst.

A detail of an alteration processing for a denitration catalyst will be explained next. FIG. 12 is a schematic diagram of still configuration of the exhaust-gas denitration system. The exhaust-gas denitration system 100 shown in FIG. 12 differs from the exhaust-gas denitration system 100 shown in FIG. 3 in that the shape of the denitration catalyst 101D is altered when the regeneration processing for the denitration catalyst 101D is performed. FIGS. 13 and 14 are schematic diagrams for explaining the alteration processing for the denitration catalyst 101D. As shown in FIGS. 13 and 14, the alteration processing is specifically cutting of the denitration catalyst 101D in parallel to a plane surface into two denitration catalysts 1201 and 1202. The denitration catalysts 1201 and 1202 are installed in the exhaust-gas denitration system 100 while a predetermined distance is kept therebetween.

In the example shown in FIG. 13, the denitration catalysts 1201 and 1202 are substantially equal in width ("w" for both the denitration catalysts 1201 and 1202). Alternatively, as shown in FIG. 14, the denitration catalyst 101D may be cut and separated so that a width of the denitration catalyst 1201 (the width "$w_1$") and a width of the denitration catalyst 1202 (the width "$w_2$") differ ("$w_1$">"$w_2$"). At that time, if the respective widths are changed according to the position or the like of the denitration catalyst to be altered, the alteration processing can be performed more efficiently.

Furthermore, the alteration processing may include not only cutting in parallel to the plane surface but also cutting and separation of the denitration catalyst perpendicularly to the plane surface, or at an arbitrary angle. The denitration catalyst may be cut into not two but three or more. While the alteration processing is performed during the regeneration processing in the above explanation, only the alteration processing may be performed without performing the regeneration processing. Alternatively, the same alteration processing may be performed during not the regeneration processing but the replacement processing.

(Another Functional Configuration of Denitration Catalyst Management Device)

Figure 15:
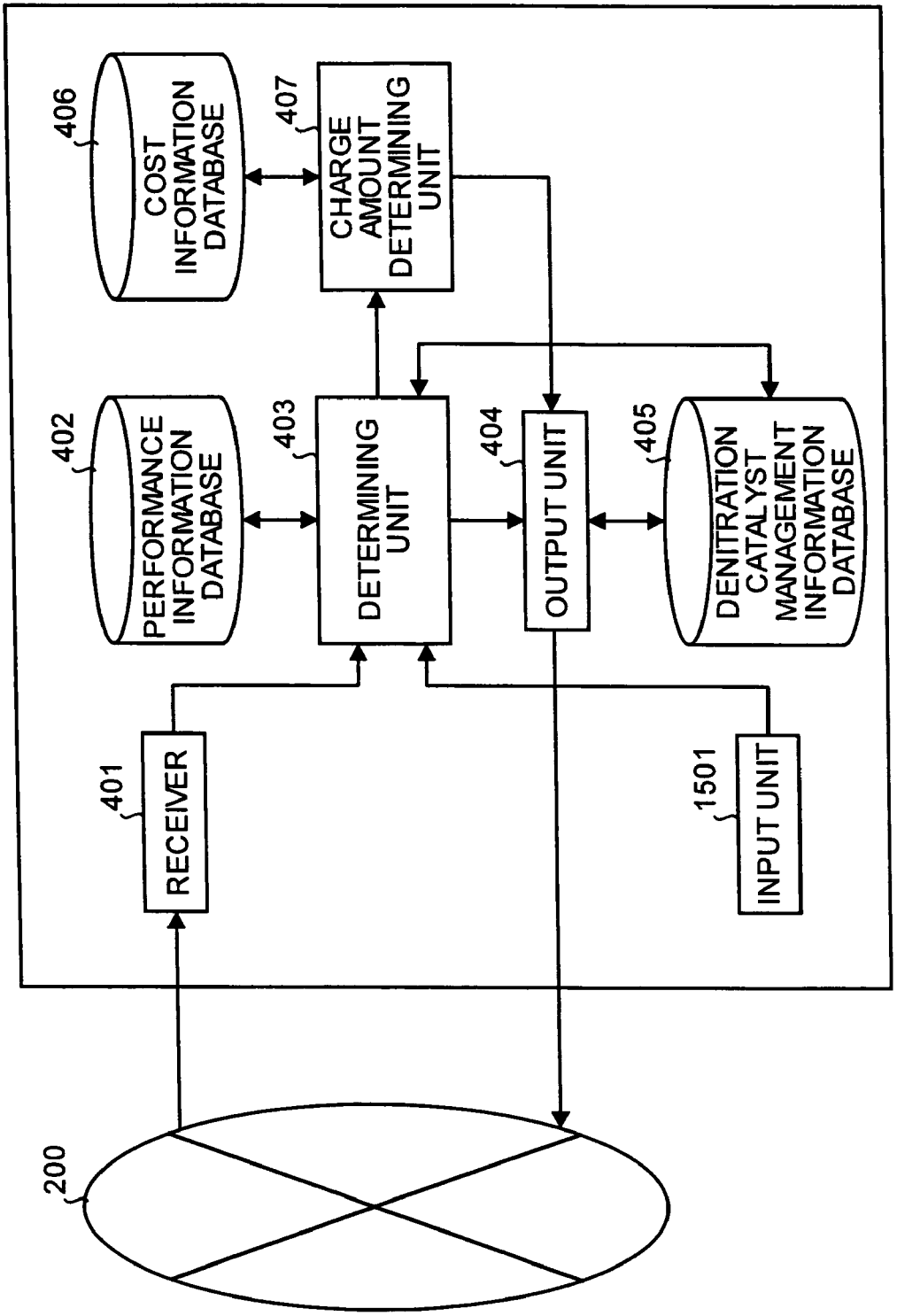
FIG. 15 is a schematic diagram for explaining another functional configuration of the apparatus for managing a denitration catalyst according to the embodiment of the present invention.

Another functional configuration of the apparatus for managing a denitration catalyst according to the embodiment of the present invention will be explained next. FIG. 15 is a schematic diagram for explaining another functional configuration of the apparatus for managing a denitration catalyst according to an embodiment of the present invention. In FIG. 15, like reference numerals designate like constituent elements as those shown in FIG. 4, and they will not be explained herein. With the functional configuration shown in FIG. 4, the determination is made based on the measurement result of the denitration catalysts in the management target exhaust-gas denitration system. In the example shown in FIG. 15, the denitration catalysts in the management target exhaust-gas denitration system are not measured. Instead, the performance of the management target denitration catalysts in the exhaust-gas denitration system are predicted from information on management of the other exhaust-gas denitration systems, and management is performed based on the prediction.

In FIG. 15, the apparatus for managing a denitration catalyst 201 includes the receiver 401, the performance information database 402, the determining unit 403, the output unit 404, the denitration catalyst management information database 405, the cost information database 406, the charge amount determining unit 407, and an input unit 1501.

The input unit 1501 accepts input of information on an equipment scale and an operating time of exhaust-gas denitration system, of which the performance is to be predicted. Specifically, functions of the input unit 1501 are realized with a pointing device such as a keyboard or a mouse, not shown. Alternatively, the information may be input to the receiver 401 through the network 200.

The determining unit 403 predicts the performance of the denitration catalysts in the exhaust-gas denitration system for each denitration catalyst based on the input information on the equipment scale and the operating time of the exhaust-gas denitration system. During the prediction, information on performance of a plurality of denitration catalysts in the other exhaust-gas denitration systems stored in the performance information database 402, and information on the execution timing of the denitration catalyst regeneration processing, the denitration catalyst replacement processing, or the new denitration catalyst addition processing determined based on the performance information and stored in the denitration catalyst management information database 405 are used. Based on the predicted performance of the denitration catalysts, the execution timing of the denitration catalyst regeneration processing, the denitration catalyst replacement processing, or the new denitration catalyst addition processing is determined for each denitration catalyst. A result of the determination is output by the output unit 404, or stored in the denitration catalyst management information database.

As explained above, according to the embodiments of the present invention, the performance of the denitration catalysts 101 are measured for each of the denitration catalyst 101. Based on the measured performance, determination is made as to which of the processings is to be performed, the regeneration processing for the denitration catalysts 101 or the replacement processing therefor, or determination is made on whether neither of the processings is performed, for each denitration catalyst 101. The performance of the denitration catalysts 101 can be grasped for each denitration catalyst 101, and an appropriate processing can be carried out for each denitration catalyst 101 based on the grasped performance. It is, therefore, possible to efficiently and cost-effectively manage the denitration catalysts 101.

According to the embodiments of the present invention, the optimum regeneration processing is selected from among a plurality of regeneration processings when the regeneration processing for the denitration catalysts 101 is performed based on the measured performance. It is, therefore, possible to more efficiently and more cost-effectively manage the denitration catalysts.

According to the embodiments of the present invention, a plurality of denitration catalysts 101 including those in the exhaust-gas denitration systems in the power stations suspended or discontinued are managed comprehensively and intensively using the network. For example, the denitration catalyst 101 is replaced by the denitration catalyst that has been used in the other exhaust-gas denitration system and that has been subjected to the regeneration processing. It is, therefore, possible to facilitate management for more appropriate replacement of the denitration catalyst 101, and suppress total cost.

According to the embodiments of the present invention, if it is determined to perform the regeneration processing, it is possible to charge the user the amount of money at the predetermined ratio to the difference between the cost required for the replacement processing and the cost required for the regeneration processing.

As another accounting method, denitration catalysts are owned, and the owned denitration catalysts are rented out to facilities including the denitration systems such as the thermal power station or the waste incinerator. The periodic maintenance management and the daily management for the rented denitration catalysts are executed to carry out the $NO_x$ treatment for the power station. The used denitration catalyst may be a new or a regenerated catalyst. All the managements and the checks are executed to ensure a hedge (to avoid risk) against the $NO_x$ treatment. In compensation for the managements and the checks, a rental fee calculated from the denitration catalyst installation cost and the management cost can be collected. As a result, a long-term rental contract enables the user to take environmental measures at lower cost than that required to purchase the denitration catalysts.

Furthermore, the execution timing of the regeneration processing for the denitration catalysts 101 or the replacement processing therefor is determined for each denitration catalyst 101 based on the measured performance. By notifying the regeneration or replacement timing in advance, efficient measures for the processing can be taken.

In the daily management of the denitration catalysts 101, the exhaust gas is measured for each denitration catalyst 101 at the inlet and the outlet therefor. In the periodic maintenance management of the denitration catalysts 101, the sample of each denitration catalyst 101 is extracted and the performance of the extracted sample is measured. Therefore, it is possible to acquire more accurate information on the performance of the denitration catalysts 101.

Moreover, the performance of the management target denitration catalysts in the exhaust-gas denitration system are predicted based on the already measured data on the denitration catalysts in the other exhaust-gas denitration systems. It is, therefore, unnecessary to measure the performance of the management target exhaust-gas denitration system. Accordingly, it is unnecessary to separately provide facilities for the measurement and take labor and time for the measurement.

As explained, the present invention advantageously provides the method and the apparatus for managing a denitration catalyst that can comprehensively and intensively manage a denitration catalyst, and ensure efficient and cost-effective management for the denitration catalyst including regeneration and replacement therefor.

INDUSTRIAL APPLICABILITY

As described above, the present invention is suitable for a method and an apparatus for managing a denitration catalyst that perform maintenance for denitration catalysts including regeneration, replacement, addition, and alteration by managing the denitration catalysts in an exhaust-gas denitration system.

The invention claimed is:

1. A method for managing one or more denitration catalysts in an exhaust-gas denitration system, the method comprising:
   measuring $[NH_3]$ and $[NO_x]$ at an inlet and an outlet of each denitration catalyst;
   measuring extent of deterioration of each denitration catalyst in consideration of both $[NH_3]$ and $[NO_x]$; and
   determining, based on nature of deterioration, which one of the following processes is to be performed (1) regeneration of the denitration catalysts; (2) replacement of the denitration catalysts; or (3) neither of the regeneration nor the replacement is performed,
   wherein the extent of deterioration is determined by calculating a denitration ratio ($\eta$) according to the following equation (2):

$$\eta \frac{(\text{inlet } NH_3 - \text{outlet } NH_3)}{(\text{inlet } NH_3 - \text{outlet } NH_3 + \text{outlet } NO_x)} \times 100 \times \frac{\text{evaluation mole ratio}}{\text{inlet mole ratio}}. \tag{2}$$

2. The method for managing one or more denitration catalysts according to claim 1, wherein
   the regeneration process includes a plurality of ways of regeneration, and
   when it is determined to perform the regeneration, the determining includes selecting an optimum way of regeneration based on the nature of deterioration of the denitration catalysts,
   wherein the regeneration consists of (a) reversing the gas flow direction, (b) washing with water, (c) removing with chemicals, (d) scraping the catalyst surface or (e) re-impregnation.

3. The method for managing one or more denitration catalysts according to claim 1, further comprising replacing, when it is determined to perform the replacement, one of the denitration catalysts with a denitration catalyst that has been used in another exhaust-gas denitration system and that has undergone regeneration.

4. The method for managing one or more denitration catalysts according to claim 1, further comprising determining a charge amount to be collected, when it is determined to perform the regeneration, by acquiring an amount of money at a predetermined ratio to an amount of a difference between a cost required for the replacement and a cost required for the regeneration.

5. The method for managing one or more denitration catalysts according to claim 1, further comprising determining a charge amount to be collected from a user of the exhaust-gas denitration system based on a cost required for installation and management of the denitration catalysts.

6. The method for managing one or more denitration catalysts according to claim 1, wherein
the extent of deterioration is measured by checking an exhaust gas at the inlet and the outlet of each of the denitration catalysts in a daily management for the denitration catalysts.

7. The method for managing one or more denitration catalysts according to claim 1, wherein
the measuring of the extent of deterioration includes, in a periodic maintenance for the denitration catalysts,
extracting a sample of the denitration catalysts, and
measuring extent of deterioration of the sample.

8. The method for managing one or more denitration catalysts according to claim 1, further comprising dividing, when it is determined to perform the replacement, a denitration catalyst to be replaced.

9. The method for managing one or more denitration catalysts according to claim 1, further comprising dividing, when it is determined to perform the regeneration, a denitration catalyst to be regenerated.

10. The method for managing one or more denitration catalysts according to claim 1, wherein
the determining includes determining, based on the nature of deterioration, whether at least one of the regeneration, the replacement, and an addition of a new denitration catalyst is performed or none of the regeneration, the replacement, and the addition is performed, for each of the denitration catalysts.

11. The method for managing one or more denitration catalysts according to claim 10, further comprising adding, when it is determined to perform the addition, a denitration catalyst that has been used in another exhaust-gas denitration system, and that has undergone regeneration.

12. The method for managing one or more denitration catalysts according to claim 10, further comprising dividing, when it is determined to perform the addition, a denitration catalyst to be added.

13. A method for managing one or more denitration catalysts in an exhaust-gas denitration system, the method comprising:
measuring [$NH_3$] and [$NO_x$] at inlets and outlets of each denitration catalysts;
measuring extent of deterioration of each denitration catalyst in consideration of both [$NH_3$] and [$NO_x$]; and
determining, based on the extent of deterioration, execution timing for regeneration of the denitration catalysts and for replacement of the denitration catalysts, for each of the denitration catalysts,
wherein the extent of deterioration is determined by calculating a denitration ratio ($\eta$) according to the following equation (2):

$$\eta = \frac{(\text{inlet NH}_3 - \text{outlet NH}_3)}{(\text{inlet NH}_3 - \text{outlet NH}_3 + \text{outlet NO}_x)} \times \quad (2)$$

$$100 \times \frac{\text{evaluation mole ratio}}{\text{inlet mole ratio}}.$$

14. The method for managing one or more denitration catalysts according to claim 13, wherein
the determining includes determining execution timing for addition of a new denitration catalyst for each of the denitration catalysts in addition to the execution timing for the regeneration and for the replacement.

15. The method for managing one or more denitration catalysts according to claim 13, wherein
the extent of deterioration is measured by checking an exhaust gas at the inlet and the outlet of each of the denitration catalysts in a daily management for the denitration catalysts.

16. The method for managing one or more denitration catalysts according to claim 13, wherein
the measuring of the extent of deterioration includes, in a periodic maintenance for the denitration catalysts,
extracting a sample of each of the denitration catalysts, and
measuring extent of deterioration of the sample.

17. A method for managing one or more denitration catalysts in an exhaust-gas denitration system, the method comprising:
predicting performance of each of the denitration catalysts based on information on a scale and a total time of operation of the exhaust-gas denitration system; and
determining execution timing for regeneration of the denitration catalysts, for replacement of the denitration catalysts, and for addition of a new denitration catalyst, besides already provided denitration catalysts, based on the performance,
wherein the performance is determined by calculating a denitration ratio ($\eta$) according to the following equation (2):

$$\eta = \frac{(\text{inlet NH}_3 - \text{outlet NH}_3)}{(\text{inlet NH}_3 - \text{outlet NH}_3 + \text{outlet NO}_x)} \times \quad (2)$$

$$100 \times \frac{\text{evaluation mole ratio}}{\text{inlet mole ratio}}.$$

18. An apparatus for managing one or more denitration catalysts in an exhaust-gas denitration system, the apparatus comprising a measuring device:
a receiver that receives, through a network, information on extent of deterioration of each of the denitration catalysts that is measured by the measuring device that includes a gas extracting unit that measures [$NH_3$] and [$NO_x$] at inlets and outlets of each of the denitration catalysts;
a performance information database that stores the information; and
a CPU that determines, based on the information in the storage unit and in consideration of both [$NH_3$] and [$NO_x$] which process is to be performed, regeneration of the denitration catalysts or replacement of the denitration catalysts, or neither of the regeneration nor the replacement is performed, for each of the denitration catalysts,
wherein the extent of deterioration is determined by calculating a denitration ratio ($\eta$) according to the following equation (2):

$$\eta = \frac{(\text{inlet NH}_3 - \text{outlet NH}_3)}{(\text{inlet NH}_3 - \text{outlet NH}_3 + \text{outlet NO}_x)} \times 100 \times \frac{\text{evaluation mole ratio}}{\text{inlet mole ratio}}. \quad (2)$$

19. The apparatus for managing one or more denitration catalysts according to claim 18, wherein
the CPU determines whether at least one of the regeneration, the replacement, and an addition of a new denitration catalyst is performed, or none of the regeneration, the replacement, and the addition is performed, for each of the denitration catalysts based on the information in the storage unit.

20. An apparatus for managing one or more denitration catalysts in an exhaust-gas denitration system that includes a measuring device, the apparatus comprising a measuring device:
a receiver that receives, through a network, information on extent of deterioration of each of the denitration catalysts that is measured by the measuring device that includes a gas extracting unit that measures [NH$_3$] and [NO$_x$] at inlets and outlets of each of the denitration catalysts;
a performance information database that stores the information; and
a CPU that determines, based on the information in the storage unit and in consideration of both [NH$_3$] and [NO$_x$] execution timing for regeneration of the denitration catalysts and for replacement of the denitration catalysts for each of the denitration catalysts,
wherein the extent of deterioration is determined by calculating a denitration ratio ($\eta$) according to the following equation (2):

$$\eta = \frac{(\text{inlet NH}_3 - \text{outlet NH}_3)}{(\text{inlet NH}_3 - \text{outlet NH}_3 + \text{outlet NO}_x)} \times 100 \times \frac{\text{evaluation mole ratio}}{\text{inlet mole ratio}}. \quad (2)$$

21. The apparatus for managing a plurality of denitration catalysts according to claim 20, wherein
the CPU determines execution timing for an addition of a new denitration catalyst for each of the denitration catalysts based on the information in the storage unit in addition to the execution timing for the regeneration and for the replacement.

22. An apparatus for managing one or more denitration catalysts in a first exhaust-gas denitration system, the apparatus comprising a measuring device:
a performance information database that stores information on performance of a plurality of denitration catalysts in a second exhaust-gas denitration system and information on execution timing for regeneration of the denitration catalysts, for replacement of the denitration catalysts, and for addition of a new denitration catalyst that are determined based on the information on the performance of the denitration catalysts in the second exhaust-gas denitration system;
a receiver that receives information on a scale and a total time of operation of the first exhaust-gas denitration system;
a predicting unit that predicts performance of each of the denitration catalysts in the first exhaust-gas denitration system based on the information received and the information in the storage unit; and
a CPU that determines execution timing for the regeneration, for the replacement, and for the addition for each of the denitration catalysts, besides already provided denitration catalysts, based on the performance predicted,
wherein the performance is determined by calculating a denitration ratio ($\eta$) according to the following equation (2):

$$\eta = \frac{(\text{inlet NH}_3 - \text{outlet NH}_3)}{(\text{inlet NH}_3 - \text{outlet NH}_3 + \text{outlet NO}_x)} \times 100 \times \frac{\text{evaluation mole ratio}}{\text{inlet mole ratio}}. \quad (2)$$

* * * * *